United States Patent
Chen et al.

(10) Patent No.: US 10,454,549 B1
(45) Date of Patent: Oct. 22, 2019

(54) ANTENNA SWITCHING SYSTEM

(71) Applicant: WISTRON NEWEB CORPORATION, Hsinchu (TW)

(72) Inventors: Yung-Jinn Chen, Hsinchu (TW);
Ching-Feng Huang, Hsinchu (TW);
Tsung-Tsung Huang, Hsinchu (TW);
Yu-Meng Yen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 15/963,719

(22) Filed: Apr. 26, 2018

(51) Int. Cl.
*H04B 7/06* (2006.01)
*H04W 52/02* (2009.01)

(52) U.S. Cl.
CPC ...... *H04B 7/0602* (2013.01); *H04W 52/0206* (2013.01)

(58) Field of Classification Search
CPC .. H04B 7/0413; H04B 7/0617; H04B 7/0456; H04B 7/0417; H04B 7/0639
See application file for complete search history.

(56) References Cited

U.S. PATENT DOCUMENTS

| | | | | |
|---|---|---|---|---|
| 7,405,695 | B2 * | 7/2008 | Liu | H01Q 3/24 342/374 |
| 2005/0117545 | A1 * | 6/2005 | Wittwer | H04B 7/0802 370/332 |
| 2010/0214171 | A1 * | 8/2010 | Quan | H01Q 1/28 342/374 |
| 2010/0226292 | A1 * | 9/2010 | Gorbachov | H04B 1/48 370/280 |
| 2011/0003563 | A1 * | 1/2011 | Gorbachov | H01Q 21/0025 455/78 |

\* cited by examiner

*Primary Examiner* — Shuwang Liu
*Assistant Examiner* — Gina M Mckie
(74) *Attorney, Agent, or Firm* — Li & Cai Intellectual Property (USA) Office

(57) ABSTRACT

An antenna switching system is provided. The system includes a radio frequency (RF) circuit for transmitting and receiving signals, a first antenna, a second antenna, a first switch, a first switch assembly, a second switch assembly, and a power divider. The first switch electrically connected to the RF circuit. The first switch assembly electrically connected between the first switch and the first antenna. The second switch assembly electrically connected between the first switch and the second antenna. The power divider electrically connected between the first switch and the first switch assembly and between the first switch and the second switch assembly. When the first switch is switched to the power divider, the signals are transmitted by the first antenna and the second antenna.

13 Claims, 13 Drawing Sheets

ANTENNA SWITCHING SYSTEM

BACKGROUND OF THE INVENTION

1. Field of the Invention

The present disclosure relates to an antenna switching system that utilizes a novel circuit to meet the requirements of a single beam operation and a combined beam operation for a smart antenna.

2. Description of Related Art

The smart antenna plays an important role in the existing and next-generation wireless communication systems, which has the advantages of improving the efficiency of spectrum resources, system capacity, and communication quality. One of main functions of the smart antenna technology is beamforming. A beamforming technology is for creating the radiation pattern for a beam to direct in a particular direction, and includes a switched beamforming technique and an adaptive beamforming technique.

FIG. 1 shows a schematic diagram of a conventional switched beamforming circuit. As shown in the figure, six diode switching circuits are provided, and each H-polarized antenna sector is controlled by one diode switching circuit for turning the RF signal on or off. Each diode switching circuit consists of a bias circuit, a diode, a control circuit, and a matching network (MN). Theoretically, the impedance matching network (MN1, MN2) can achieve a 50-ohm matching between radio frequency circuit RF1 and one of the antenna sectors when any one of the diode switching circuits is turned on to form a single beam.

When two adjacent diode switching circuits need to be turned on to form a combined beam, the parallel impedance would become 50-ohm//50-ohm=25-ohm, therefore, the impedance matching would not able to be achieved between the parallel impedance and the impedance matching network MN1.

Moreover, when the adjacent two diode switching circuits are turned on to form a combined beam, causing poor isolation between two antenna sectors since the impedances thereof are not matched, and the isolation is not good between the adjacent two diode switching circuits, such that the efficiency of the combined beam would be low.

The bias voltage for the diode is generally about 3.3V. Therefore, in order to provide a voltage to reach a reverse bias for the diode to turn off the diode, the control circuit must able to provide the reverse bias voltage greater than 3.3V which is generally about 5V or 12V. In order to supply voltages greater than 5V, the system mainboard may require a DC to DC converter, which may increase the costs.

Therefore, a novel antenna switching system is needed to meet the requirements of the single beam and the combined beam required for a smart antenna, while achieving low costs and low operation voltage.

SUMMARY OF THE INVENTION

According to an embodiment of the present disclosure, there is provided an antenna switching system including a first radio frequency (RF) circuit, a first switch circuit, and a plurality of first antennas. The first switch circuit includes a first switch, a power divider, and at least two second switches. The first switch includes a first common port, a power divider (PD) port and at least two first ports, and the first common port is coupled to the first RF circuit. The power divider includes a second common port and at least two second ports, and the second common port is coupled to the PD port of the first switch. Each of the at least two second switches includes a third common port, a third port, and a fourth port. The third ports of the at least two second switches are respectively coupled to the at least two first ports, and the fourth ports of the at least two second switches are respectively coupled to the at least two second ports of the power divider. The plurality of first antennas coupled to the third common ports of the at least two second switches. When the first common port is switched to the PD port, the fourth ports of the at least two second switches are respectively switched to the third common ports of the at least two second switches, and a number of the plurality of first antennas is at least two.

According to another embodiment of the present disclosure, there is provided an antenna switching system including a radio frequency (RF) circuit for transmitting and receiving signals, a first antenna, a second antenna, a first switch, a first switch assembly, a second switch assembly, and a power divider. The first switch electrically connected to the RF circuit. The second switch assembly electrically connected between the first switch and the second antenna. The power divider electrically connected between the first switch and the first switch assembly and between the first switch and the second switch assembly. When the first switch is switched to the power divider, the signals are transmitted by the first antenna and the second antenna.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as modes of use, further objectives and advantages thereof, will best be understood with reference to the following detailed description of exemplary embodiments of the present disclosure when read in conjunction with the accompanying drawings, wherein:

DETAILED DESCRIPTION OF THE
PREFERRED EMBODIMENTS

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
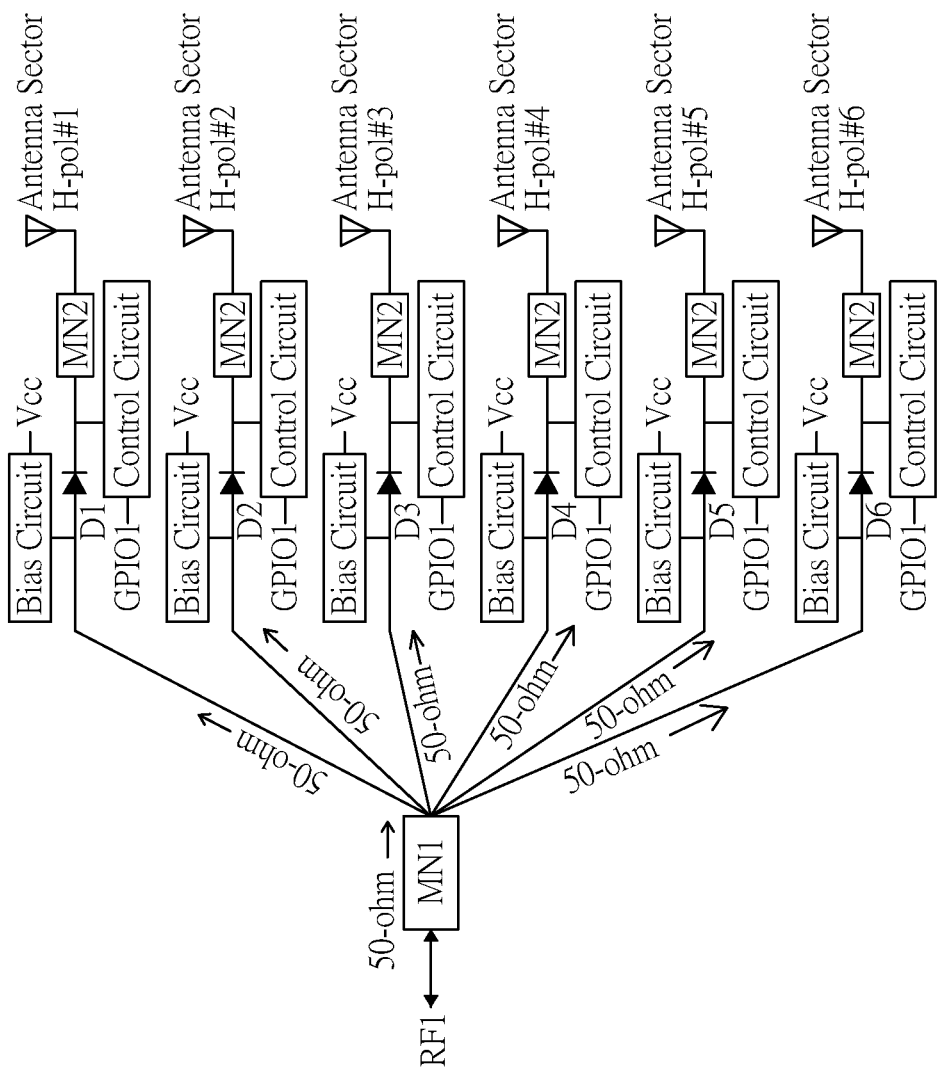
FIG. 1 shows a schematic diagram of a conventional switched beamforming circuit.
Figure 2:
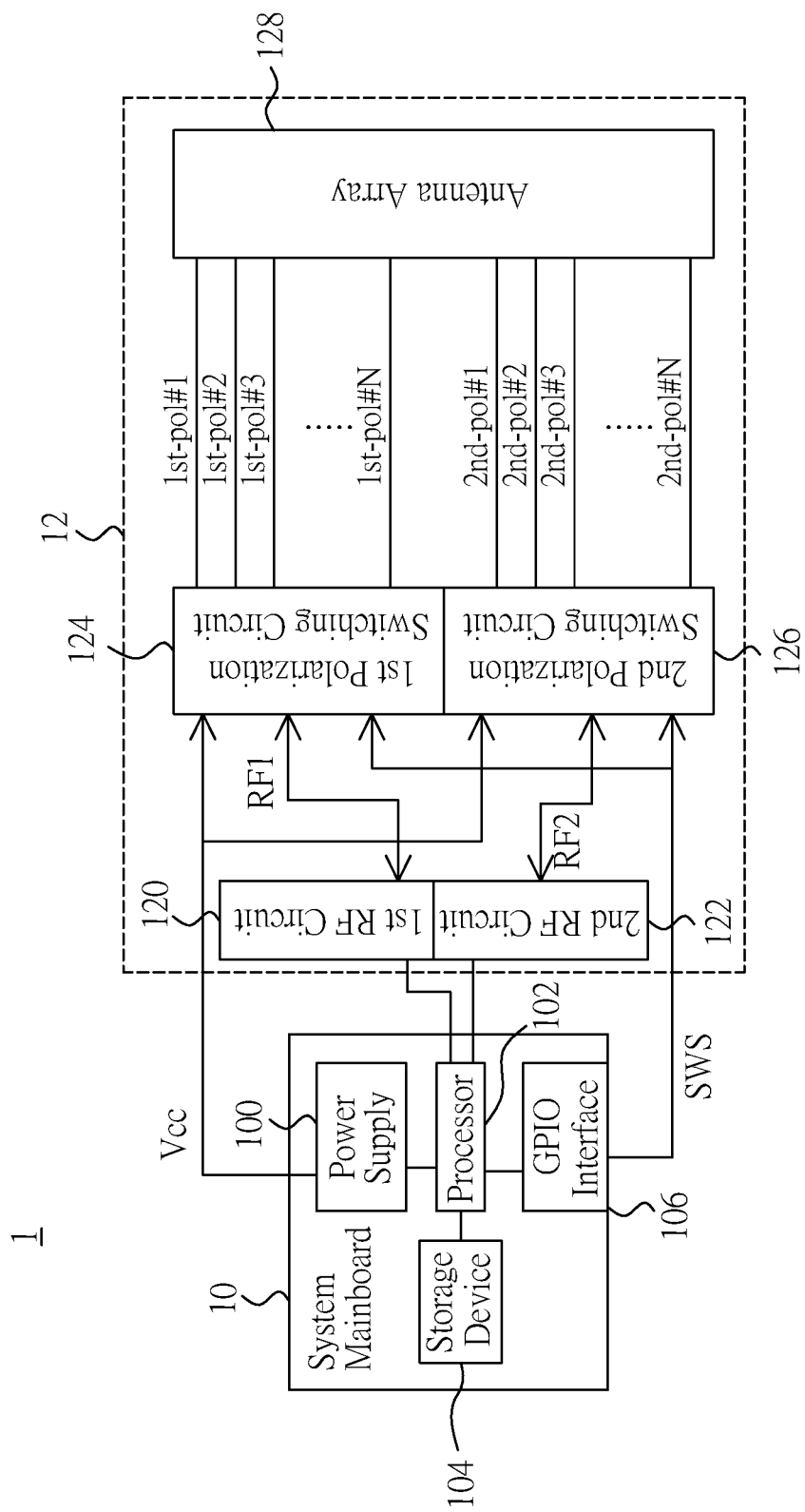
FIG. 2 is a block diagram illustrating an antenna system constructed according to an embodiment of the present disclosure.

FIG. 2 is a block diagram illustrating an antenna system constructed according to an embodiment of the present disclosure. Referring to FIG. 2, the antenna system 1 is adapted to be applied in a wireless transmission device, such as a wireless router. The wireless communication system architecture of the antenna system 1 includes a system mainboard 10 and an antenna switching system 12. The system mainboard 10 includes a power supply 100, a processor 102, a storage device 104, and a general purpose input/output (GPIO) interface 106, a first radio frequency (RF) circuit 120, and a second RF circuit 122. The antenna switching system 12 includes a first polarization switching circuit 124, a second polarization switching circuit 126, and an antenna array 128. In another embodiment, the first polarization switching circuit 124 and the second polarization switching circuit 126 can be disposed on the system mainboard 10.

The processor 102 is electrically connected to the power supply 100, the storage device 104, and the general purpose input/output (GPIO) interface 106, respectively. The processor 102 may include any custom-made or commercially available processor, a central processing unit (CPU), or application specific integrated circuits (ASICs).

The storage device 104 can include any one of a combination of volatile memory elements (e.g., random-access memory (RAM, such as DRAM, and SRAM, etc.)) or nonvolatile memory elements. The power supply 100 may include a power source, a regulator, and a power management module to provide the required power to the processor 102 and the antenna switching system 12.

Each of the first RF circuit 120 and the second RF circuit 122 may be a transceiver or an RF IC, and it can generate a transmission signal to the first polarization switching circuit 124 or the second polarization switching circuit 126 or process a reception signal from the first polarization switching circuit 124 or the second polarization switching circuit 126. The first RF circuit 120 and the second RF circuit 122 may each include a power amplifier.

The processor 102 may provide control signals to the first RF circuit 120 and the second RF circuit 122 for transmitting and receiving signals RF1 and RF2 through the first polarization switching circuit 124 and the second polarization switching circuit 126, respectively, and the processor 102 may provide switching signals SWS to the first polarization switching circuit 124 and the second polarization switching circuit 126 through GPIO interface 106. In order to form the desired single beam and combined beam, the processor 102 is configured to execute the antenna switching algorithm stored in the storage device 104 to control the first polarization switching circuit 124 and the second polarization switching circuit 126 to be switched to certain antenna(s) of the antenna array 128. The antenna array 128 includes a plurality of antennas electrically connected to the first polarization switching circuit 124 and the second polarization switching circuit 126 via wires 1st-pol#1 to 1st-pol#N and wires 2nd-pol#1 to 2nd-pol#N assigned to multiple antenna sectors. Each antenna sectors can provide two types of polarization operation, for example, Horizontal polarization and Vertical polarization operations, so the entire antenna array 128 has a plurality of Horizontal polarization feeding points and a plurality of Vertical polarization feeding points. Furthermore, different types of linear polarization and circular polarization operations may also be provided.

Although the first RF circuit 120, the second RF circuit 122, the first polarization switching circuit 124 and the second polarization switching circuit 126 are provided in the present embodiment, the antenna switching system may include merely one RF circuit and one polarization switching circuit.

Figure 3:
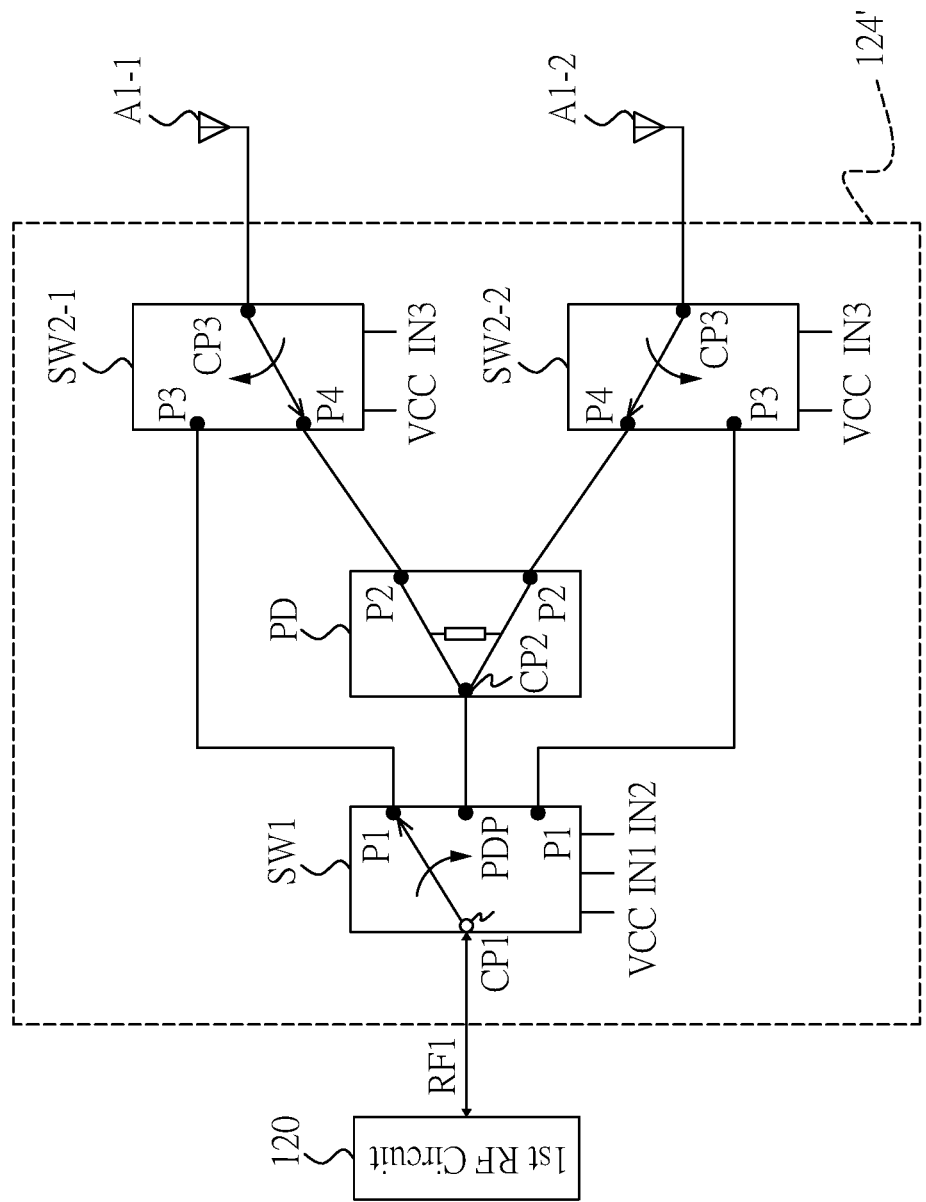
FIG. 3 is a circuit diagram illustrating an antenna switching system constructed according to an embodiment of the present disclosure.

Reference is now made to FIG. 3, which is a circuit diagram illustrating an antenna switching system constructed according to an embodiment of the present disclosure. The antenna switching system 12 includes the first RF circuit 120, a first switch circuit 124', and two first antennas A1-1 and A1-2. The first switch circuit 124' includes a first switch SW1, a power divider PD, and two second switches SW2-1 and SW2-2. The first switch SW1 may be a single pole triple throw (SP3T) switch, which includes a first common port CP1, a power divider (PD) port PDP and two first ports P1.

The power divider PD includes a second common port CP2 and two second ports P2, and the second common port CP2 is coupled to the PD port PDP of the first switch SW1. Power dividers are passive microwave components used for power division or power combining. In power division, an input signal is divided into two (or more) output signals of lesser power, while a power combiner accepts two or more input signals and combines them at an output port. The coupler or divider may have three ports, four ports, or more, and may be (ideally) lossless. Three-port networks take the form of T-junctions and other power dividers, while four-port networks take the form of directional couplers and hybrids. Power dividers usually provide in-phase output signals with an equal power division ratio (3 dB), but unequal power division ratios are also possible. In this case, a Wilkinson power divider may be utilized, which is such a network with the useful property of appearing lossless when the output ports are matched; that is, only reflected power from the output ports is dissipated.

The two second switches SW2-1 and SW2-2, each may be a single pole dual throw (SPDT) switch and includes a third common port CP3, a third port P3, and a fourth port P4. The third ports of the second switches SW2-1 and SW2-2 are respectively coupled to the two first ports P1, and the fourth ports P4 of the two second switches SW2-1 and SW2-2 are respectively coupled to the two second ports P2 of the power divider PD.

The first switch SW1 is powered by a power line VCC and controlled by control lines IN1 and IN2 to select a signal path for the first common port CP1 to transmit/receive RF signals through the upper first port P1, the PD port PDP, or the lower first port P1. In other words, according to the signals given to the first switch SW1 via the control lines IN1 and IN2, the first switch SW1 couples the first RF circuit 120 to either the upper first port P1, the PD port PDP or the lower first port P1.

Each of the second switches SW2-1 and SW2-2 is powered by a power line VCC and controlled by control lines IN3 to select a signal path for the third common port CP3 to transmit/receive RF signals through the third port P3 or the fourth port P4. In other words, according to the signals given to each of the second switches SW2-1 and SW2-2 via the control lines IN3, the second switches SW2-1 and SW2-2 couple the third ports CP3 to either the power divider PD or the first switch SW1.

The two first antennas A1-1 and A1-2 coupled to the third common ports CP3 of the two second switches SW2-1 and SW2-2, respectively.

The present embodiment is an example of the antenna switching system with two antenna sectors. All of the switches can be switched and controlled by the processor 102 through the GPIO interface GPIO. First, when single-beam operation of the first antenna A1-1 is to be achieved, the first common port CP1 of the first switch SW1 is switched to the upper first port P1, and the third common port CP3 of the second switch SW2-1 is switched to to the third port P3. Similarly, when single-beam operation of the first antenna A1-2 is to be achieved, the first common port CP1 of the first switch SW1 is switched to the lower first port P1, and the third common port CP3 of the second switch SW2-2 is switched to the third port P3.

Secondly, when a combined-beam operation of the first antennas A1-1 and A1-2 is to be achieved, the first common port CP1 of the first switch SW1 is switched to the PD port PDP, and the third common ports CP3 of the second switches SW2-1 and SW2-2 are switched to the fourth port P4. When RF signals pass through the 3 dB power divider PD, the power divider PD divides or combines the RF signals of adjacent antenna sectors to transmit or receive signals.

An important consideration in achieving a combined-beam is the phase balance of the two synthesis paths. Otherwise, the RF signals are easily subtracted from each other at the time of synthesis. Therefore, the SP2 Ts of the two second switches SW2-1 and SW2-2 may be identical, for example, using the same model of components. The antenna switching system provided in the present disclosure has a symmetrical architecture, such that the required phase balance may be easily achieved.

Figure 4A:
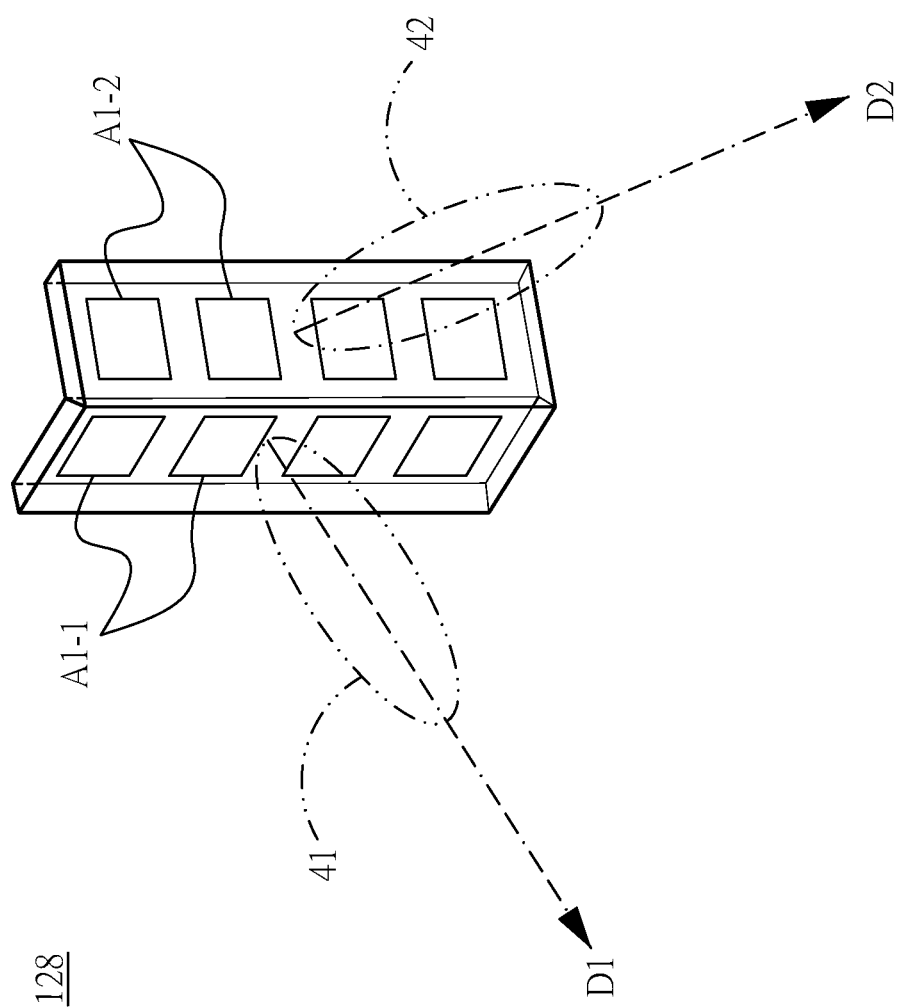
FIG. 4A shows a schematic diagram of the antenna array according to an embodiment of the present disclosure.
Figure 4B:
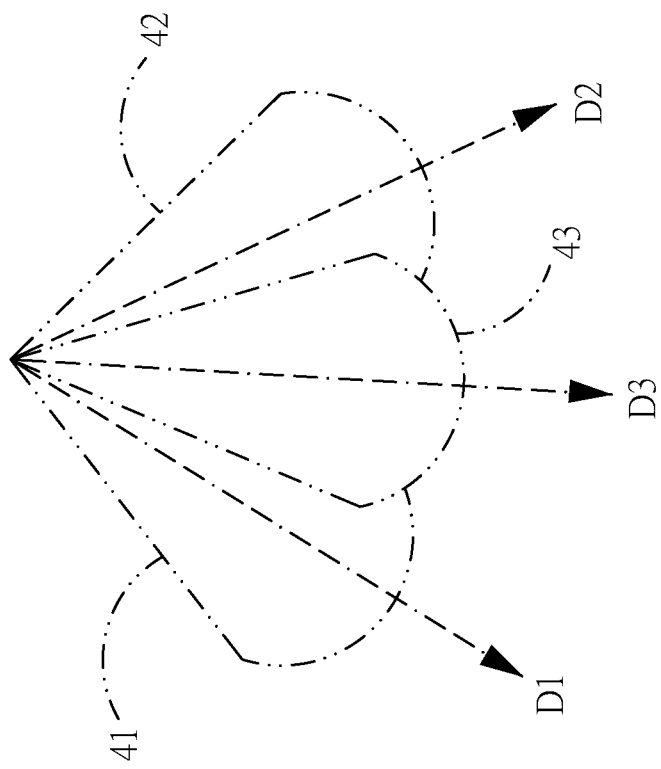
FIG. 4B shows a radiation pattern of the antenna array according to the embodiment of the present disclosure.

Reference is now made to FIGS. 4A and 4B. FIG. 4A shows a schematic diagram of the antenna array according to an embodiment of the present disclosure, FIG. 4B shows a radiation pattern of the antenna array according to the embodiment of the present disclosure.

The antenna array of FIG. 4A includes two antenna sectors. Each antenna sector covers a sector area of about 60 degrees. Each of the antenna sectors includes four antennas, for examples, the first antennas A1-1 and A1-2. Each antenna sector forms a single beam that can transmit and receive RF signals individually, and can also be combined with adjacent antenna sectors to form a combined beam to transmit and receive RF signals. As shown in FIG. 4B, a first radiation pattern 41 formed by the first antenna A1-1 is toward to a first direction D1, a second radiation 42 formed by the first antenna A1-2 is toward to a second direction D2, and when the first common port CP1 is switched to the PD port PDP, a radiation pattern formed by the first antennas A1-1 and A1-2 is toward to a third direction D3. Therefore, an angle resolution of radiation patterns can be increased by two single beams and one combined beam.

Figure 5:
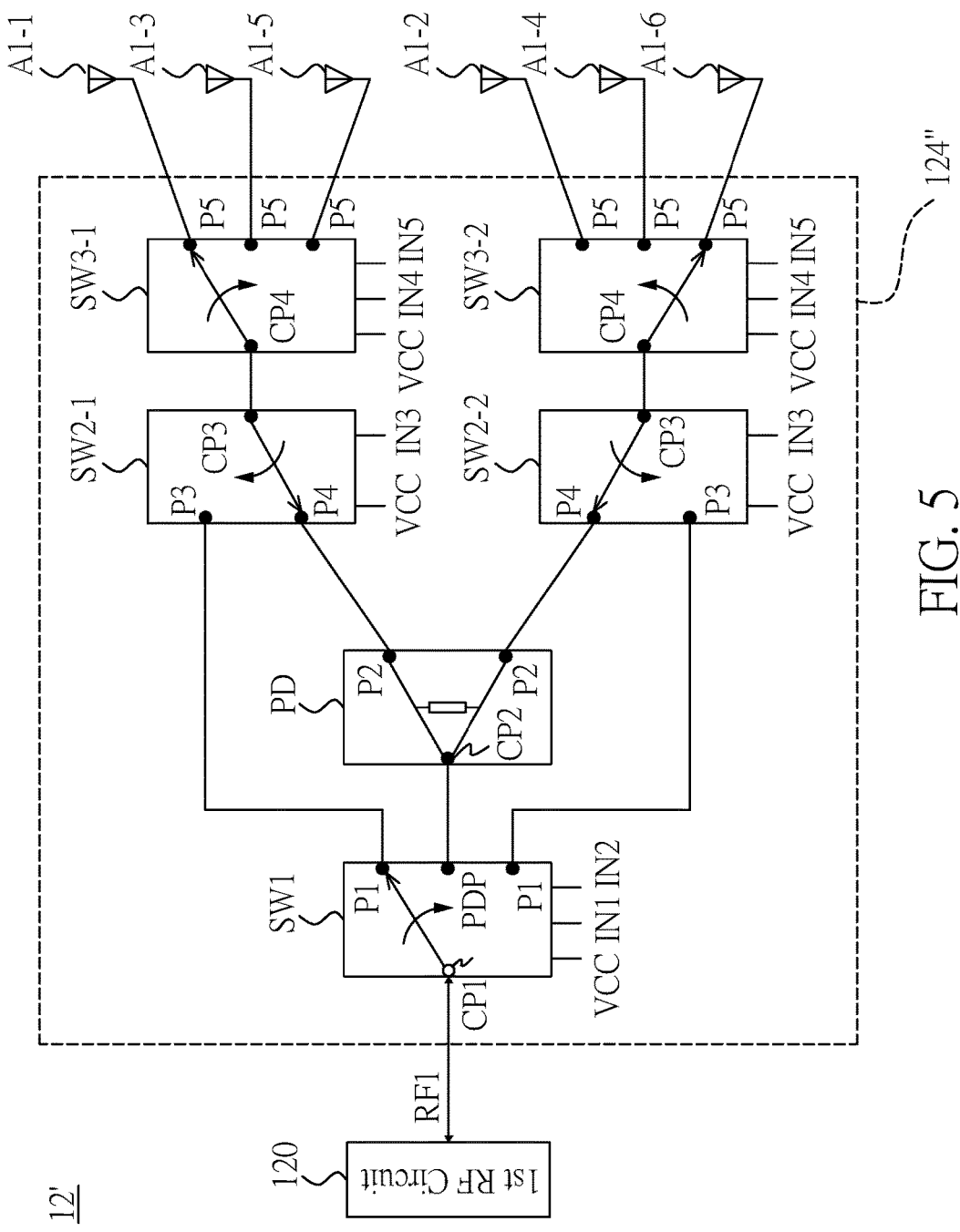
FIG. 5 is a circuit diagram illustrating an antenna switching system constructed according to another embodiment of the present disclosure.

Reference is now made to FIG. 5, which is a circuit diagram illustrating an antenna switching system constructed according to another embodiment of the present disclosure. As shown in FIG. 5, the antenna switching system 12' includes the first RF circuit 120, a first switch circuit 124", and six first antennas A1-1 through A1-6. In the present embodiment, the first RF circuit 120, the first switch SW1, the power divider PD, and the two second switches SW2-1 and SW2-2 are as the same as those depicted in the FIG. 3, therefore, the repeated descriptions are omitted.

Differently, the first switch circuit 124" in the present embodiment further includes two third switches SW3-1 and SW3-2. Each of the two third switches SW3-1 and SW3-2 may be a SP3T switch and include a fourth common port CP4 and three fifth ports P5, and the fourth common ports CP4 of the two third switches SW3-1 and SW3-2 are respectively coupled to the third common ports CP3 of the two second switches SW2-1 and SW2-2. The six first antennas A1-1 through A1-6 are coupled to the fifth ports P5 of the two third switches SW3-1 and SW3-2. Specifically, the first antennas A1-1, A1-3, and A1-5 are coupled to the fifth ports of the upper third switch SW3-1, and the first antennas A1-2, A1-4, and A1-6 are coupled to the fifth ports of the lower third switches SW3-2.

The fourth common port CP4 of each of the two third switches SW3-1 and SW3-2 is selectively switched to one of the three fifth ports P5 of the two third switches SW3-1 and SW3-2. In more detail, each of the two third switches SW3-1 and SW3-2 is powered by a power line VCC and controlled by control lines IN4 and IN5 to select a signal path for the fourth common port CP4 to transmit/receive RF signals through the upper fifth port P5, the middle fifth port P5, or the lower fifth port P5. In other words, according to the signals given to the third switch SW3-1 or SW3-2 via the control lines IN4 and IN5, the third switch SW3-1 or SW3-2 couples the third common port CP3 of the second switch SW2-1 or SW2-2 to either the upper, middle or lower fifth port P5.

The present embodiment is an example of the antenna switching system with six antenna sectors. All of the switches can be switched and controlled by the processor 102 through the GPIO interface GPIO. First, when single-beam operation of one of the first antenna A1-1 through A1-6 is to be achieved, the first common port CP1 of the first switch SW1 is switched to the upper first port P1 or the lower first port P1, the third common port CP3 of the second switch SW2-1 or SW2-2 is also switched to the corresponding third port P3, and the fourth common port CP4 of the third switch SW3-1 or SW3-2 corresponding to the selected one of the first antennas A1-1 through A1-6 is switched to the corresponding fifth port P5.

Secondly, when a combined-beam operation of one of the first antennas A1-1, A1-3, and A1-5 and one of the first antennas A1-2, A1-4, and A1-6 is to be achieved, the first common port CP1 of the first switch SW1 is switched to the PD port PDP, the third common ports CP3 of the second switches SW2-1 and SW2-2 are switched to the fourth ports P4, and the fourth common ports CP4 of the third switch SW3-1 and SW3-2 are switched to the fifth ports P5 to the selected two of six first antennas A1-1 through A1-6. Specifically, one of the first antennas A1-1, A1-3, and A1-5 and one of the first antennas A1-2, A1-4, A1-6. When RF signals pass through the 3 dB power divider PD, the power divider PD divides or combines the RF signals of adjacent antenna sectors to transmit or receive signals.

Although the six fifth ports P5 and the six first antennas A1-1 through A1-6 are provided, the numbers of the fifth ports P5 and the first antennas are not limited to the present embodiment. The numbers of the fifth ports P5 and the first antennas may be at least four.

Similarly, the phase balance of the two of the six synthesis paths are considered for achieving a combined-beam. The SP2 Ts of the two second switches SW2-1 and SW2-1 may be identical, for example, using the same model of components, and the SP3 Ts of the first switch SW1, the two third switches SW3-1 and SW3-2 may be identical. The antenna switching system provided in the present disclosure has a symmetrical architecture, such that the required phase balance may be easily achieved.

Figure 6A:
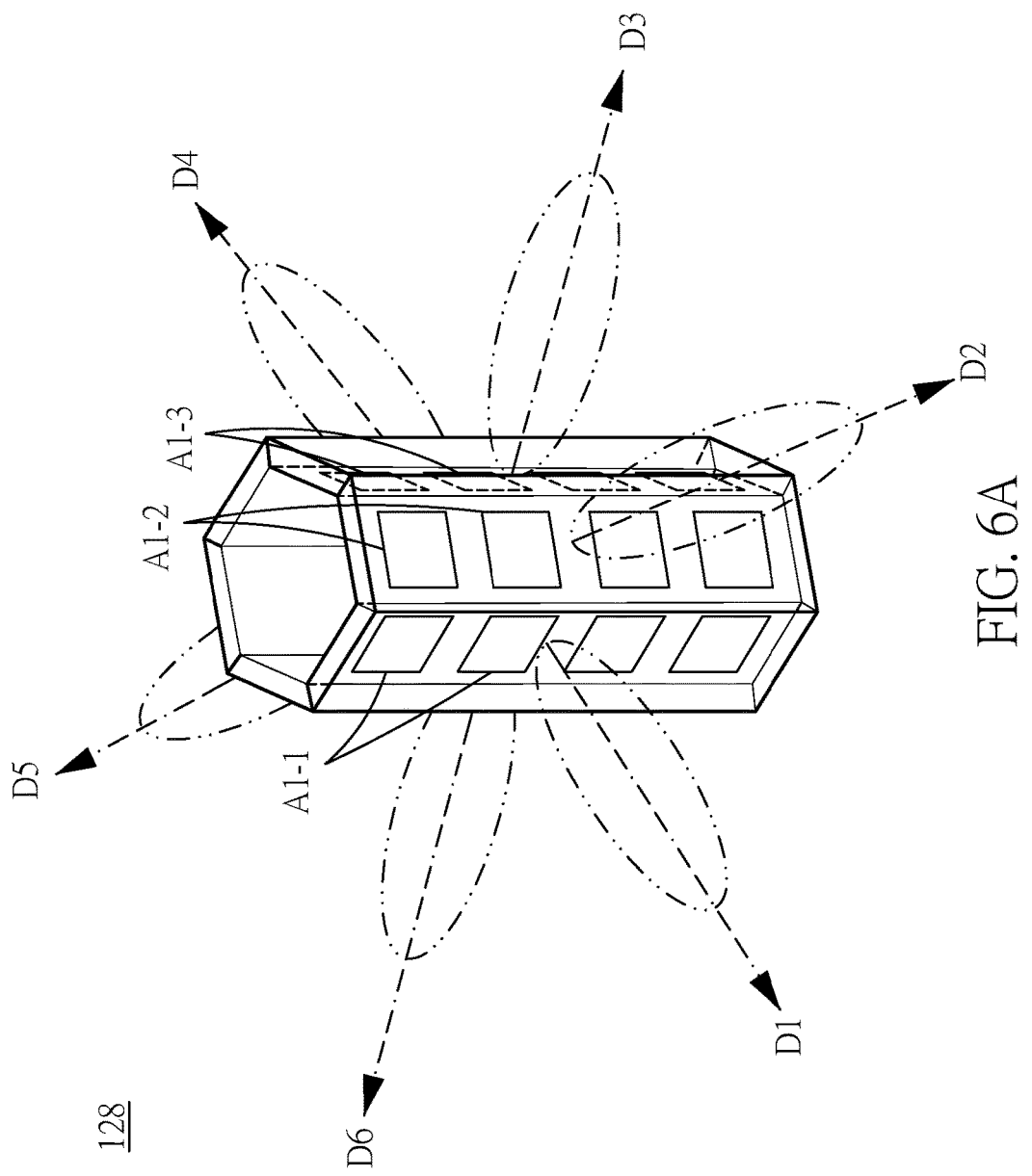
FIG. 6A shows a schematic diagram of the antenna array according to another embodiment of the present disclosure.
Figure 6B:
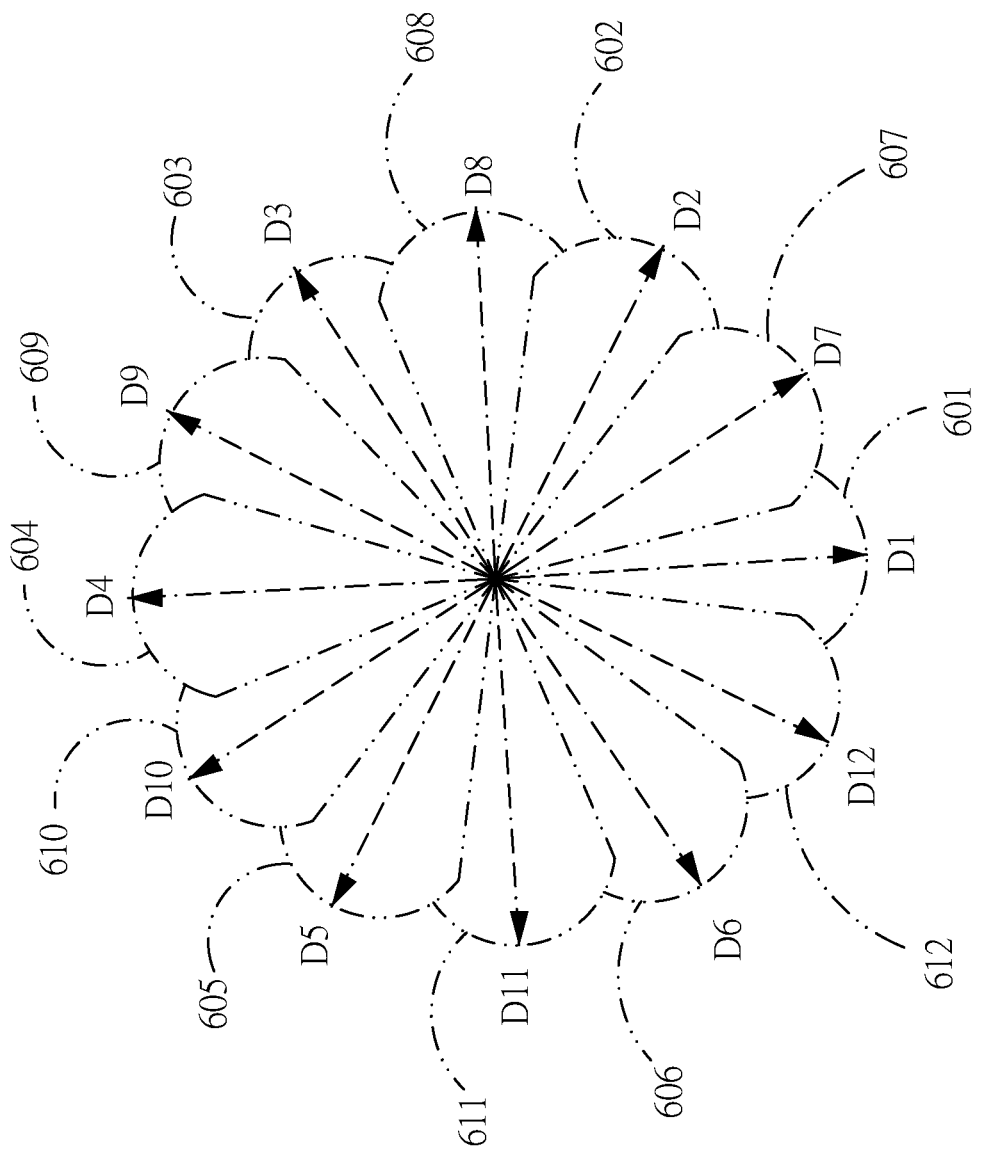
FIG. 6B shows a radiation pattern of the antenna array according to another embodiment of the present disclosure.

Reference is now made to FIGS. 6A and 6B. FIG. 6A shows a schematic diagram of the antenna array according to another embodiment of the present disclosure, and FIG. 6B shows a radiation pattern of the antenna array according to another embodiment of the present disclosure.

The antenna array of FIG. 6A includes six antenna sectors. Each antenna sector covers a sector area of about 60 degrees. Each of the antenna sectors may include four antenna elements (e.g., patch antenna) that form a single antenna, for examples, the first antennas A1-1 through A1-6. Each antenna sector forms a single beam that can transmit and receive RF signals individually, and can also be combined with adjacent antenna sectors to form a combined beam to transmit and receive RF signals. In the embodiment, the first antennas A1-1 through A1-6 are spaced at equal intervals around a circumference of a circle, but the arrangement is not limited to this embodiment, the first antennas A1-1 through A1-6 are spaced at equal intervals along a straight line, or the arrangement may be provided by spacing at unequal intervals to form other shapes.

As shown in FIG. 6B, a first radiation pattern 601 formed by the first antenna A1-1 is toward to a first direction D1, a second radiation pattern 602 formed by the first antenna A1-2 is toward to a second direction D2, a third radiation pattern 603 formed by the first antenna A1-3 is toward to a third direction D3, a fourth radiation pattern 604 formed by the first antenna A1-4 is toward to a fourth direction D4, a fifth radiation pattern 605 formed by the first antenna A1-5 is toward to a fifth direction D5, and a sixth radiation pattern 606 formed by the first antenna A1-6 is toward to a sixth direction D6. When the first common port CP1 is switched to the PD port PDP, a seventh radiation pattern 607 formed by the first antennas A1-1 and A1-2 may be toward to a seventh direction D7, an eighth radiation pattern 608 formed by the first antennas A1-2 and A1-3 may be toward to an eighth direction D8, a ninth radiation pattern 609 formed by the first antennas A1-3 and A1-4 may be toward to a ninth direction D9, a tenth radiation pattern 610 formed by the first antennas A1-4 and A1-5 may be toward to a tenth direction D10, an eleventh radiation pattern 611 formed by the first antennas A1-5 and A1-6 may be toward to a eleventh direction D11, a twelfth radiation pattern 612 formed by the first antennas A1-6 and A1-1 may be toward to a twelfth direction D12. Therefore, a higher angle resolution radiation patterns can be increased by six single beams and six combined beams.

Specifically, the SP2T/SP3T RF switches and 3 dB power divider/combiner used in the present disclosure are commercially available in any frequency band, and generally, the 50-ohm impedance matching of each switch has basically been completed before shipment. No impedance mismatch problem existed for either the single beam or the combined beam operation. The isolation of the single beam for each antenna sector is achieved by the circuit isolation between the two third switches SW3-1 and SW3-2 at the last stage. The isolation of the combined beams of two adjacent antenna sectors is achieved by the circuit isolation between the two second ports of the 3 dB power divider/combiner, and isolations more than 20 dB may be basically achieved by utilizing the SP2T/SP3T RF switches and 3 dB power divider/combiner in this architecture.

A single beam or combined beam operation for any number of antenna sectors may also be achieved by simply replacing the two third switches SW3-1 and SW3-2 at the last stage in the present embodiment, which will be described in more detail hereinafter.

Figure 7:
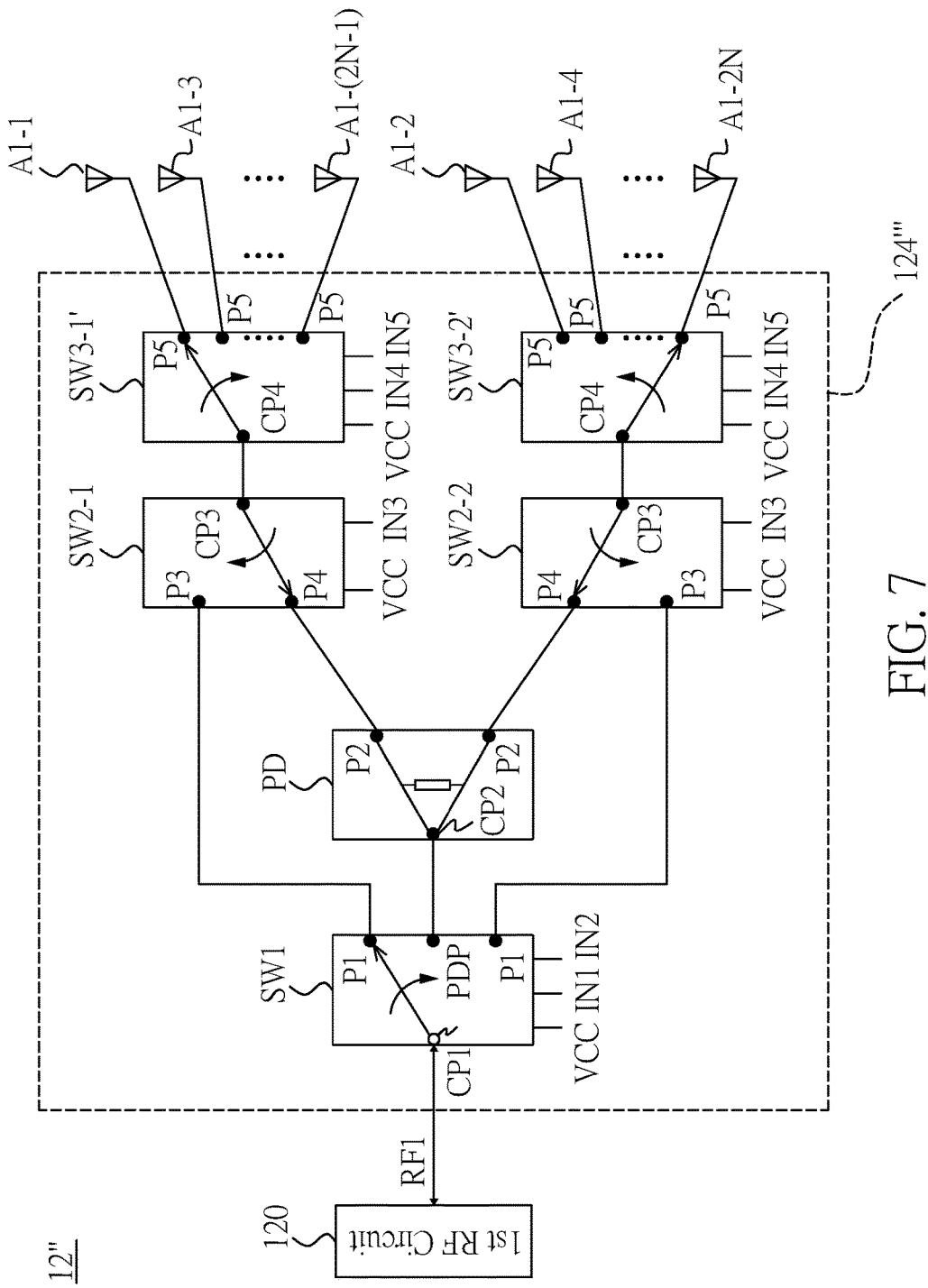
FIG. 7 is a circuit diagram illustrating an antenna switching system constructed according to yet another embodiment of the present disclosure.

Reference is now made to FIG. 7, which is a circuit diagram illustrating an antenna switching system constructed according to yet another embodiment of the present disclosure. As shown in FIG. 7, the antenna switching system 12" includes the first RF circuit 120, a first switch circuit 124", and first antennas A1-1 through A1-2N. In the present embodiment, the first RF circuit 120, the first switch SW1, the power divider PD, and the two second switches SW2-1 and SW2-2 are as the same as those depicted in the FIG. 5, therefore, the repeated descriptions are omitted.

In this case, a number of the first ports of the first switch SW1, a number of the second ports of the power divider PD, and numbers of the second switches and the third switches may vary according to a required number of first antennas participating in the combined beam operation. Therefore, the number of the first ports of the first switch SW1 and the number of the second ports of the power divider PD, and the numbers of the second switches and the third switches may be at least two. For example, if three first antennas are expected to participate in the combined beam operation, the numbers of the first ports of the first switch SW1, the second ports of the power divider PD, the second switches, and the third switches may be three, such that each of the combined beams may be formed by three antenna sectors. Optionally, the numbers of the fifth ports of the two third switches SW3-1' and SW3-2' may be equal to one another, that is, N in the present embodiment.

Differently, each of the two third switches SW3-1' and SW3-2' may be a SPNT switch and include a fourth common port CP4 and N fifth ports P5, and the fourth common ports CP4 of the two third switches SW3-1' and SW3-2' are respectively coupled to the third common ports CP3 of the two second switches SW2-1 and SW2-2, where N is an integer larger than 2. The first antennas A1-1 through A1-2N are coupled to the fifth ports P5 of the two third switches SW3-1' and SW3-2'. Specifically, the first antennas A1-1, A1-3, A1-5, . . . , and A1-(2N−1) may be coupled to the N fifth ports of the upper third switch SW3-1', and the first antennas A1-2, A1-4, A1-6, . . . , and A1-2N may be coupled to the N fifth ports of the upper third switches SW3-2'. In the embodiment, the first antennas A1-1 through A1-2N may be arranged in sequence and spaced at equal intervals around a circumference of a circle, but the arrangement is not limited to this embodiment, the first antennas A1-1 through A1-2N are spaced at equal intervals along a straight line, or the arrangement may be provided by spacing at unequal intervals to form other shapes.

The present embodiment is an example of the antenna switching system with two antenna sectors. All of the switches can be switched and controlled by the processor 102 through the GPIO interface GPIO. First, when single-beam operation of one of the first antenna A1-1, A1-3, . . . , A1-(2N−1) is to be achieved, the first common port CP1 of the first switch SW1 is switched to the upper first port P1, the third common port CP3 of the second switch SW2-1 is switched to the upper third port P3, and the fifth port of the third switch SW3-1' corresponding to the selected one of the first antennas A1-1, A1-3, . . . , A1-(2N−1) is switched to couple the fourth common port CP4.

Secondly, when a combined-beam operation of one of the first antennas A1-1, A1-3, . . . , A1-(2N−1) and one of the first antennas A1-2, A1-4, . . . , A1-2N is to be achieved, the switching operation is similar to the above descriptions and thus is omitted. It is notably mentioned that the numbers of the fifth ports P5 and the first antennas may be at least four.

Specifically, when considering the required number of first antennas participating in the combined beam operation, the antenna switching system 12" may be designed according to the following statement: the first antenna coupled to the $i^{th}$ one of the at least two fifth ports P5 of the $j^{th}$ one of the at least two third switches are disposed next to the first antenna coupled to the $i^{th}$ one of the at least two fifth ports of the $(j+1)^{th}$ one of the at least two third switches. For example, suppose three first antennas are participating in the combined beam operation, and twelve first antennas are included in the antenna array, therefore, three second switches and three third switches should be provided. Furthermore, four fifth ports P5 should be provided for each of the three third switches. In this case, for the first three adjacent first antennas, the first antenna coupled to the $1^{st}$ fifth port P5 of the $1^{st}$ third switch is disposed next to the first antenna coupled to the $1^{st}$ fifth port P5 of the $2^{nd}$ third switch, and the first antenna coupled to the $1^{st}$ fifth port P5 of the $2^{nd}$ third switch is disposed next to the first antenna coupled to the $1^{st}$ fifth port P5 of the 3rd third switch.

In yet another embodiment of the present disclosure, a number of the third switches may be 2, and suppose that the number of the first antennas is n, and the n first antennas are arranged in sequence. In this case, the antenna switching system 12" may be designed according to the following statement: 1+2i first antennas of the n first antenna are assigned to a first group, 2+2i first antennas of the n first antenna are assigned to a second group, and the first group and the second group are coupled to the different third switches, respectively, where i is a natural number, and 2+2i is smaller than or equals to n. For example, suppose n is 8, the $1^{st}$, $3^{rd}$, $5^{th}$, $7^{th}$ first antennas are assigned to a first group, and the $2^{nd}$, $4^{th}$, $6^{th}$, $8^{th}$ first antennas are assigned to a second group, and the first group and the second group are coupled to the different third switches, that is, the first group of the n first antennas may be coupled to the first third switch, and the second group of the n first antennas may be coupled to the second third switch.

From above, the single beam or combined beam operation for any number of antenna sectors may also be achieved by simply replacing the third switches at the last stage in the present disclosure.

Figure 8A:
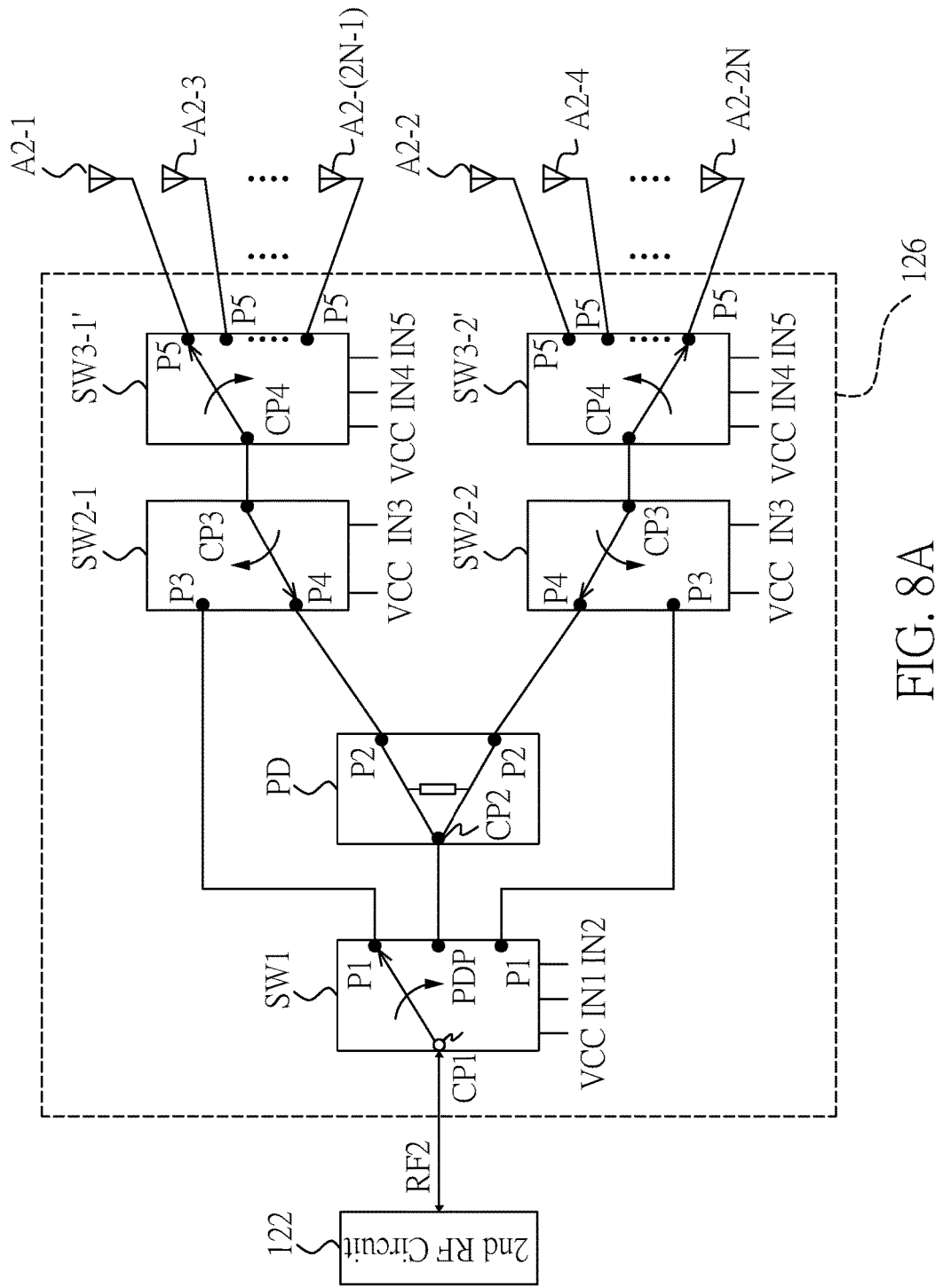
FIG. 8A is a circuit diagram illustrating an antenna switching system constructed according to the present disclosure.
Figure 8B:
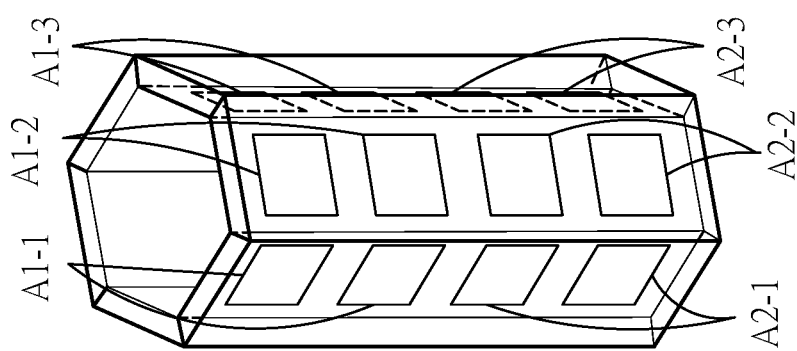
FIG. 8B shows a schematic diagram of the antenna array according to another embodiment of the present disclosure.

Reference is now made to FIGS. 7, 8A and 8B. FIG. 8A is a circuit layout illustrating an antenna switching system constructed according to the present disclosure, and FIG. 8B shows a schematic diagram of the antenna array according to another embodiment of the present disclosure.

As shown in FIGS. 7, 8A and 8B, the antenna switching system 12 further includes the second RF circuit 122, the second polarization switching circuit 126, and a plurality of second antennas A2-1 through A2-2N included in the antenna array 128. The second polarization switching circuit 126 is configured to be as the same as the first polarization switching circuit 124', 124" and 124". In this case, the first common port CP1 of the second polarization switching circuit 126 is coupled to the second RF circuit 122, and the second antennas A2-1 through A2-2N are coupled to the fifth ports P5 of the second polarization switching circuit 126. Similarly, a number of the second antenna A2-1 through A2-2N may be at least four in this embodiment, FIG. 8A. In consideration for providing two types of polarization operation, for example, Horizontal polarization and Vertical polarization operations, the entire antenna array 128, as shown in FIG. 8B, may have a plurality of Horizontal polarization feeding points and a plurality of Vertical polarization feeding points. Furthermore, different types of linear polarization and circular polarization operations may also be provided. Furthermore, types of polarization may be determined according to the positions and orientations of the antennas. For example, each of the antenna sectors may include four patch antennas, two for serving the first antennas A1-1, A1-2 or A1-3, and the other two for serving the second antennas A2-1, A2-2, or A2-3, such that the radiation patterns of the two types of polarization may be provided from each antenna sector. For example, the first antennas A1-1, A1-2 and A1-3 may be constructed as horizontal polarization antennas, and the second antennas A2-1, A2-2, and A2-3 may be constructed as vertical polarization antennas.

Figure 9:
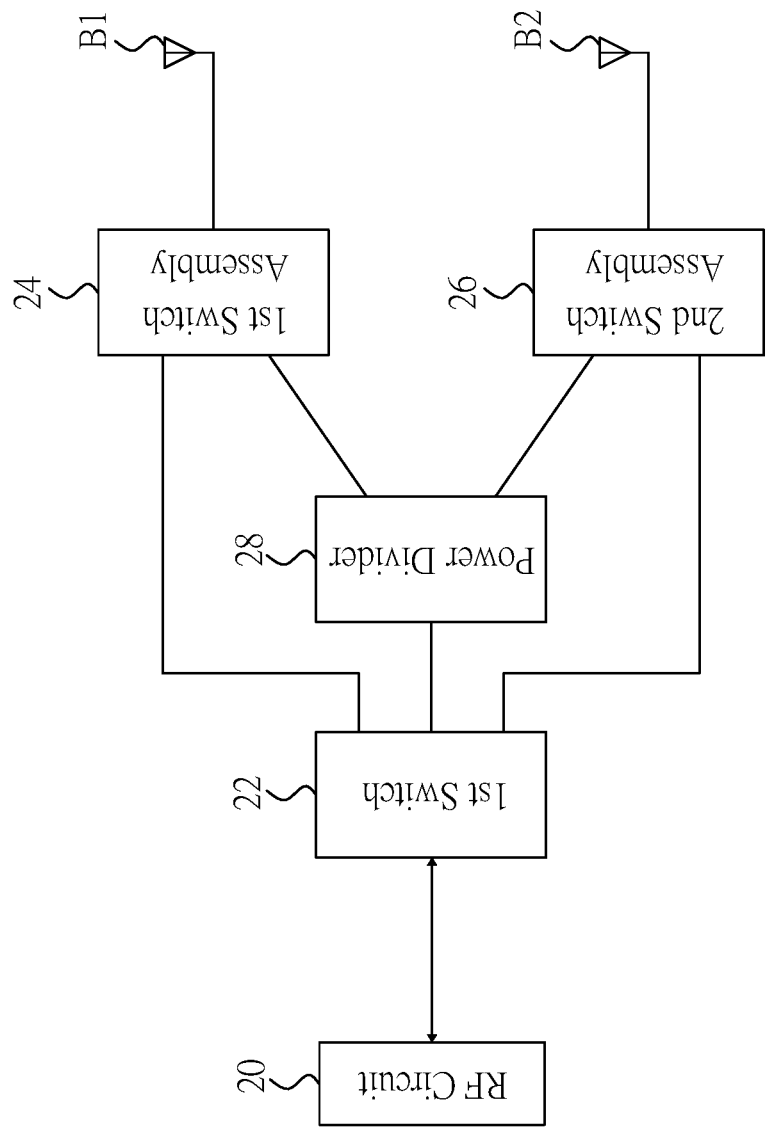
FIG. 9 is a block diagram of an antenna switching system in accordance with another exemplary embodiment of the present disclosure.

FIG. 9 is a block diagram of an antenna switching system in accordance with another exemplary embodiment of the present disclosure. The antenna switching system 2 includes a RF circuit 20 for transmitting and receiving signals, a first antenna B1, a second antenna B2, a first switch 22, a first switch assembly 24, a second switch assembly 26, and a power divider 28. The first switch 22 is electrically connected to the RF circuit 20, the first switch assembly 24 is electrically connected between the first switch 22 and the first antenna B1, the second switch assembly 26 is electrically connected between the first switch 22 and the second antenna B2. The power divider 28 is electrically connected between the first switch 22 and the first switch assembly 24 and between the first switch 22 and the second switch assembly 26.

In the present embodiment, the first switch 22 may be a SP3T switch, the power divider 28 may be a Wilkinson power divider, and the first switch assembly 24 and the second switch assembly 26 may each include a SPDT switch. Therefore, signals may be transmitted by one of the first antenna B1 and the second antenna B2 in the single beam operation, via one path including the first switch 22 and the first switch assembly 24 or another path including the first switch 22 and the second switch assembly 26, or may be transmitted by the first antenna B1 and the second antenna B2 in the combined beam operation when the first switch 22 is switched to the power divider 28, via another path including the first switch 22, the power divider 28, the first switch assembly 24 and the second switch assembly 26. The antenna switching system provided in the present embodiment has a symmetrical architecture, such that the required phase balance may be easily achieved.

Figure 10:
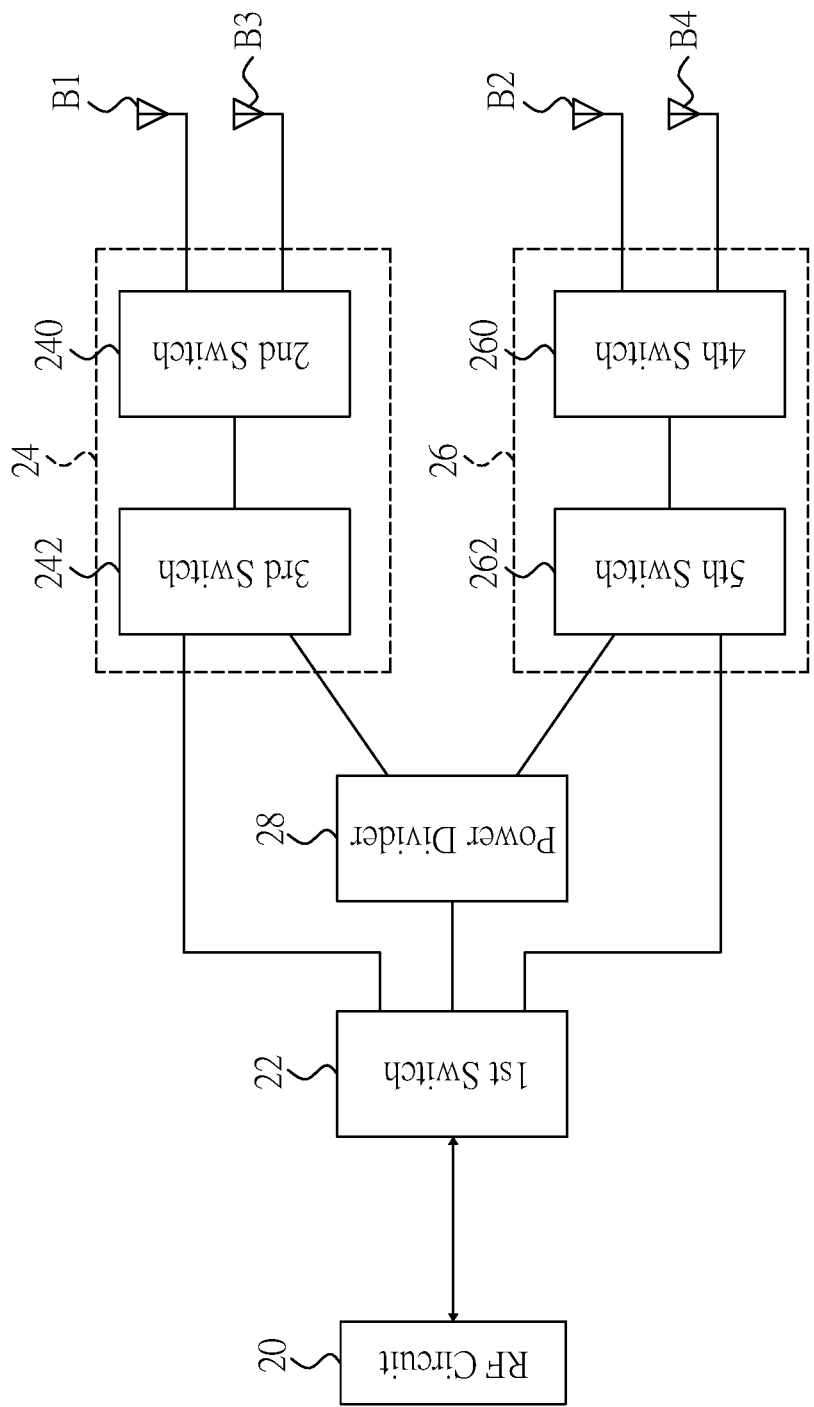
FIG. 10 is a block diagram of an antenna switching system in accordance with another exemplary embodiment of the present disclosure.

FIG. 10 is a block diagram of an antenna switching system in accordance with another exemplary embodiment of the present disclosure. As shown in FIG. 10, the antenna switching system 2 includes a RF circuit 20 for transmitting and receiving signals, a first antenna B1, a second antenna B2, a third antenna B3, a fourth antenna B4, a first switch 22, a first switch assembly 24, a second switch assembly 26, and a power divider 28. In the present embodiment, the RF circuit 20, the first antenna B1, the second antenna B2, the first switch 22, and the power divider 28 are as the same as those depicted in the FIG. 9, therefore, the repeated descriptions are omitted.

Differently, the first switch assembly 24 further includes a second switch 240 and a third switch 242, the second switch 240 is electrically connected to the first antenna B1, and the third switch 242 is electrically connected between the first switch 22 and the second switch 240. Moreover, the second switch assembly 26 further includes a fourth switch 260 and a fifth switch 262. The fourth switch 260 is electrically connected to the second antenna B2, and the fifth switch 262 is electrically connected between the first switch 22 and the fourth switch 260.

In this architecture, the power divider 28 is further electrically connected between the first switch 22 and the third switch 242, and between the first switch 22 and the fifth switch 262.

Furthermore, the antenna switching system 2 further includes the third antenna B3 and the fourth antenna B4. The third antenna B3 is electrically connected to the second switch 240, and the fourth antenna B4 is electrically connected to the fourth switch 260. In certain embodiment, the second switch 240, the third switch 242, the fourth switch 260, and the fifth switch 262 each may be the SPDT switch as mentioned above, and may be controlled by the processor to perform the single beam operation and the combined beam operation.

For performing the single beam operation, the signals may be transmitted by one of the first antenna B1, the second antenna B2, the third antenna B3, and the fourth antenna B4. For performing the combined beam operation, the signals may be transmitted by the first antenna B1 and the second antenna B2, by the first antenna B1 and the fourth antenna B4, by the second antenna B2 and the third antenna B3, or by the third antenna B3 and the fourth antenna B4.

In some embodiments, the first antenna B1, the second antenna B2, the third antenna B3 and the fourth antenna B4 may be arranged in a circle. In the embodiment, the first antennas B1 through the fourth antenna B4 may be spaced at equal intervals around a circumference of a circle, but the arrangement is not limited to this embodiment, the first antennas B1 through the fourth antenna B4 may be spaced at equal intervals along a straight line, or the arrangement may be provided by spacing at unequal intervals to form other shapes, thereby to form radiation patterns according to the requirement of the designer.

Furthermore, the number of the antennas electrically connected to the second switch 240 and the fourth switch 260 may be adjusted to be more than 2, for example, 2N antennas may be electrically connected to the second switch 240 and the fourth switch 260. In this case, the second switch 240 and the fourth switch 260 may utilize SPNT switches in order to fulfill the requirement of single beam and combined beam operations. The detailed configuration may be designed according to the embodiments depicted in FIGS. 3, 5, 7 and 8A.

From above, the antenna switching system of the present disclosure provides a circuit architecture for the smart antenna that may achieve an improved angle resolution radiation patterns by utilizing plural switches, while achieving the required phase balance in the combined-beam operation with the symmetrical architecture.

The antenna switching system of the present disclosure is also provided without utilizing any diode. The control circuit for the antenna switching system may operate at low operation voltage and without supplying voltages greater than 5V. Therefore, the system mainboard does not require any DC to DC converters, and the costs may be reduced accordingly.

Moreover, no impedance mismatch existed for either the single beam or the combined beam operation in the antenna switching system of the present disclosure. The isolation of the single beam for each antenna sector may be achieved by the circuit isolation between the switches at the last stage.

Furthermore, design rules are also provided in the present disclosure, such that the single beam or combined beam operation for any number of antenna sectors may also be achieved by simply replacing the switches at the last stage.

The description of the different exemplary embodiments has been presented for purposes of illustration and description, and is not intended to be exhaustive or limited to the disclosure in the form disclosed. Many modifications and variations will be apparent to those of ordinary skill in the art. Further, different exemplary embodiments may provide different advantages as compared to other exemplary embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. An antenna switching system, comprising:
    a first radio frequency (RF) circuit; and
    a first switch circuit, comprising:
        a first switch, comprising a first common port, a power divider (PD) port and at least two first ports, wherein the first common port is coupled to the first RF circuit;
        a power divider, comprising a second common port and at least two second ports, wherein the second common port is coupled to the PD port of the first switch; and
        at least two second switches, each comprising a third common port, a third port, and a fourth port, wherein the third ports of the at least two second switches are respectively coupled to the at least two first ports, and the fourth ports of the at least two second switches are respectively coupled to the at least two second ports of the power divider; and
        a plurality of first antennas coupled to the third common ports of the at least two second switches,
        wherein when the first common port is switched to the PD port, the fourth ports of the at least two second switches are respectively switched to the third common ports of the at least two second switches, and
        wherein a number of the plurality of first antennas is at least two.

2. The antenna switching system according to claim 1, wherein the first switch circuit further comprising:
    at least two third switches, wherein each of the at least two third switches comprises a fourth common port and at least two fifth ports, and the fourth common ports of the at least two third switches are respectively coupled to the third common ports of the at least two second switches;

wherein the plurality of first antennas are coupled to the at least two fifth ports of the at least two third switches, and wherein the fourth common port of each of the at least two third switches is selectively switched to one of the at least two fifth ports of each of the at least two third switches, and wherein the number of the plurality of first antenna is at least four.

3. The antenna switching system according to claim 2, further comprising:

a second radio frequency (RF) circuit;

a second switch circuit configured to be as the same as the first switch circuit, wherein a first common port of the second switch circuit is coupled to the second RF circuit; and a plurality of second antennas coupled to at least four fifth ports of the second switch circuit, wherein a number of the plurality of second antenna is at least four.

4. The antenna switching system according to claim 3, wherein the plurality of first antennas are constructed as horizontal polarization antennas, and the plurality of the second antennas are constructed as vertical polarization antennas.

5. The antenna switching system according to claim 2, wherein the plurality of first antennas are spaced at equal intervals around a circumference of a circle.

6. The antenna switching system according to claim 2, wherein numbers of the at least two fifth ports of the at least two third switches are equal to one another.

7. The antenna switching system according to claim 6, wherein the first antenna coupled to $i^{th}$ one of the at least two fifth ports of $j^{th}$ one of the at least two third switches are disposed next to the first antenna coupled to $i^{th}$ one of the at least two fifth ports of $(j+1)^{th}$ one of the at least two third switches.

8. The antenna switching system according to claim 6, wherein a number of the at least two third switches is 2, the number of the plurality of first antennas is n, the plurality of first antennas are arranged in sequence, 1+2i first antennas of the plurality of first antenna are assigned to a first group, 2+2i first antennas of the plurality of first antenna are assigned to a second group, and the first group and the second group are coupled to the different one of the at least two third switches, respectively, and where i is a natural number, and 2+2i≤n.

9. The antenna switching system according to claim 1, wherein the power divider is a Wilkinson power divider.

10. An antenna switching system, comprising:

a radio frequency (RF) circuit for transmitting and receiving signals;

a first antenna;

a second antenna;

a first switch electrically connected to the RF circuit;

a first switch assembly electrically connected between the first switch and the first antenna, wherein the first switch assembly further comprises:

a second switch electrically connected to the first antenna; and a third switch electrically connected between the first switch and the second switch;

a second switch assembly electrically connected between the first switch and the second antenna, wherein the second switch assembly further comprises:

a fourth switch electrically connected to the second antenna; and a fifth switch electrically connected between the first switch and the fourth switch; and a power divider electrically connected between the first switch and the first switch assembly and between the first switch and the second switch assembly;

wherein when the first switch is switched to the power divider, the signals are transmitted by the first antenna and the second antenna; and wherein the power divider electrically connected between the first switch and the third switch and between the first switch and the fifth switch.

11. The antenna switching system according to claim 10, further comprising:

a third antenna electrically connected to the second switch; and a fourth antenna electrically connected to the fourth switch, wherein when the first switch is switched to the power divider, the signals are transmitted by one of the first antenna and the second antenna, the first antenna and the fourth antenna, the second antenna and the third antenna, or the third antenna and the fourth antenna.

12. The antenna switching system according to claim 11, wherein the first antenna, the second antenna, the third antenna and the fourth antenna are arranged in a circle.

13. The antenna switching system according to claim 10, wherein the power divider is a Wilkinson power divider.

* * * * *